March 18, 1958     A. J. SORCHY     2,827,136
DRIVE-RELEASED BRAKE FOR MOTORS AND THE LIKE
Filed March 11, 1955     2 Sheets-Sheet 1
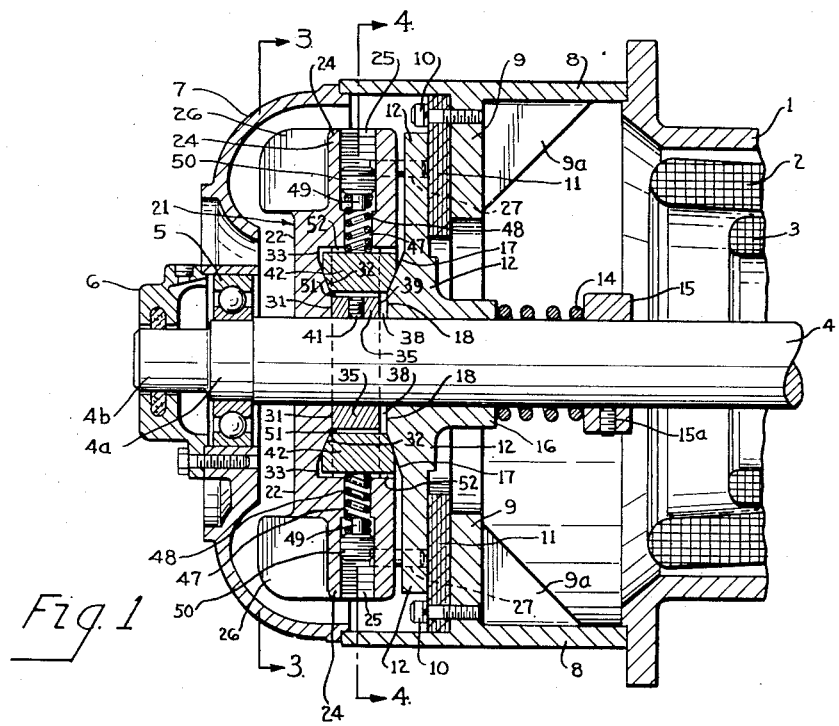
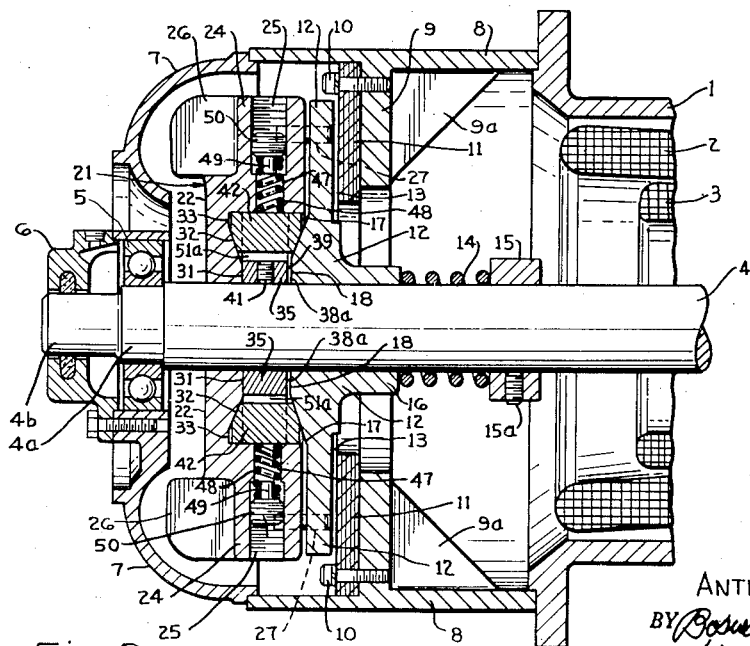
INVENTOR.
ANTHONY J. SORCHY
BY Bosworth, Sessions,
Herostrom & Lawler
ATTORNEYS.

March 18, 1958  A. J. SORCHY  2,827,136
DRIVE-RELEASED BRAKE FOR MOTORS AND THE LIKE
Filed March 11, 1955  2 Sheets-Sheet 2
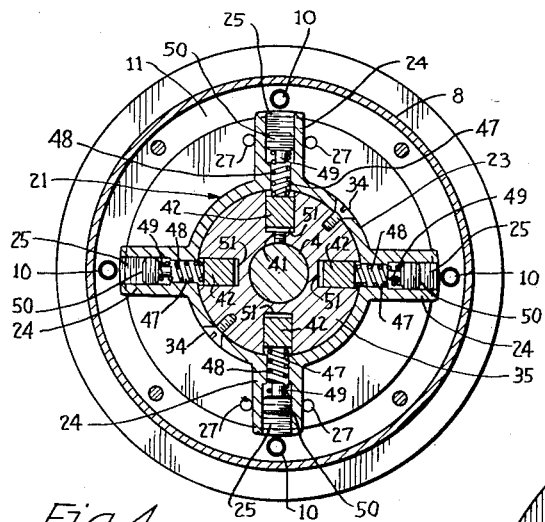
Fig. 4.
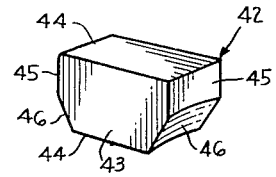
Fig. 7.
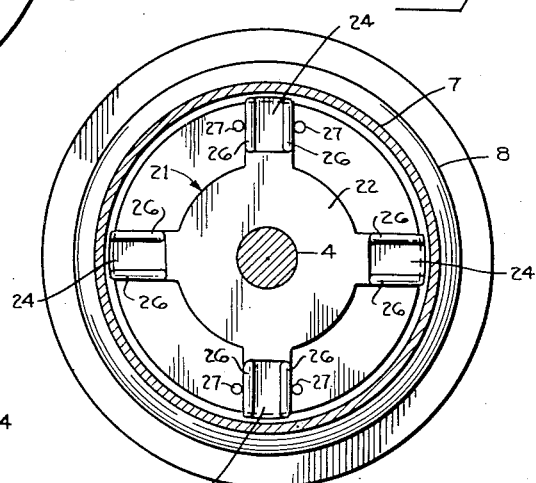
Fig. 3.
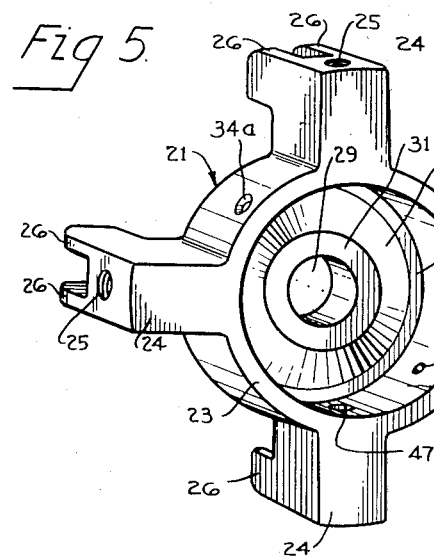
Fig. 5.
Fig. 6.
INVENTOR.
ANTHONY J. SORCHY
BY Bosworth, Sessions,
Kernstrom & Lawler
ATTORNEYS.

United States Patent Office 2,827,136
Patented Mar. 18, 1958

2,827,136

DRIVE-RELEASED BRAKE FOR MOTORS AND THE LIKE

Anthony J. Sorchy, Cleveland, Ohio, assignor to The Cleveland Electric Motor Company, Cleveland, Ohio, a corporation of Ohio Application March 11, 1955, Serial No. 493,720

18 Claims. (Cl. 188—166)

This application, which is directed to an improvement in the invention of prior application Serial 476,793, filed December 21, 1954, for "Motor Brake," relates to a mechanical brake for a dynamo-electric machine, particularly a motor.

In general, brakes for motors have in the past been of one or the other of two types; viz., electrical and mechanical, although even in the case of the former there have usually been mechanical elements such as springs which have played a part in releasing the parts from or returning them to brake-set position. Both types of brakes have had characteristic disadvantages. In the case of electrical brakes, which as a rule depend upon the use of solenoids or electro-magnets, the action tends to be abrupt, sometimes producing a pronounced hammer effect upon energization of de-energization of the motor. In the case of mechanical brakes, the hammer effect usually is lacking, but instead the brake in many cases has a tendency to "chatter" in moving between brake-set and brake-released positions.

As in the prior application, it is an object of the present invention to provide a brake for a motor or the like which is characterized by prompt, sure but nevertheless easy movement between brake-set and brake-released positions, which is free of any hammer effect, and which at the same time is devoid of any tendency to chatter. By contrast with the action of many of the brakes known to the prior art, electrical and mechanical, the action of the mechanical brake of the present invention begins immediately upon de-energization of the motor, is accomplished in progressive fashion in an extraordinarily short period of time, and is characterized by a high degree of smoothness. Similarly, on release of the brake from brake-set position, the action is virtually immediate, progressive, and of short over-all duration.

A further object of the invention is to provide a mechanical brake in which the parts are biased toward brake-set position but in which, immediately after the motor is put into operation, speed-responsive means operating under the influence of centrifugal forces begin to exercise a countervailing action on the biasing means. During the time the motor is running, the countervailing action of the speed-responsive means renders the biasing means ineffective, thus permitting the brake shoe or other movable braking element or elements to move into and to remain in brake-released position. When, however, the flow of current is interrupted, the biasing means prevail over the speed-responsive means, causing the movable braking element or elements to move promptly but noiselessly into braking engagement with suitable stationary braking means.

Other objects, advantages, and characteristics of the invention will be apparent from the description which follows and from the accompanying drawings, in which:

Figure 1 is a central vertical section along the longitudinal axis of a motor brake constructed according to the teachings of the invention, the parts being shown in brake-set position;

Figure 2 is a similar section showing the parts in brake-released position;

Figures 3 and 4 are sections on a reduced scale seen as if from lines 3—3 and 4—4 of Figure 1;

Figure 5 is a perspective, on substantially the same scale as the sections of Figures 1 and 2, of the cage member forming part of the retaining means used in the invention;

Figure 6 is a similar perspective of the wedge-mounting means; and

Figure 7 is an enlarged perspective of one of the wedges.

In the drawings, Figures 1 and 2, motor housing 1 takes the form of a metal shell or framework supporting a conventional stator 2, the latter being mounted in the usual way inside the housing. Rotor 3, likewise of conventional construction, is mounted for rotation with a rotatable shaft 4 that extends axially of the housing. At one end, shaft 4 is stepped as at 4a and 4b to fit within the usual ball bearing assembly 5 and hub cap 6. The latter is attached as shown to end bell 7. Between end bell 7 and the main portion of housing 1 is a cylindrical housing extension 8 in which is accommodated the brake of the present invention.

Projecting inwardly from housing extension 8 is an annular flange 9 reinforced as shown by means of a series of triangular webs 9a. Flange 9 is tapped at 90° intervals around its periphery to enable it to receive screws 10. The latter serve to hold in place a stationary braking element 11 of generally annular shape. Stationary braking element 11 preferably is of a conventional non-metallic brake lining material; however, it may, if desired, be made of steel or any other suitable material. When affixed to the outside face of flange 9 by means of screws 10, stationary braking element 11 presents an outwardly facing annular surface providing a large effective braking area. This surface, which is concealed in Figure 1, is exposed in Figure 2.

In apposition to stationary braking element 11 is a movable braking element 12, colloquially referred to as the brake shoe. On its inside face movable braking element 12 has an annular braking surface adapted to engage the braking surface on stationary braking element 11. When the brake is in brake-set position, as in Figure 1, these two surfaces are in contact; when the brake is in brake-released position, as in Figure 2, a clearance 13 is developed between them. If desired, movable braking element 12 may be so keyed to shaft 4 as to enable it to rotate with and also to slide axially of the shaft.

A highly resilient coil spring 14 surrounds shaft 4 in the manner illustrated in the drawings. The inner end of spring 14 bears against an abutment 15 mounted on shaft 4 by means of a set screw 15a. The other end of spring 14 presses against the proximate portion of an inwardly directed integral sleeve 16 forming part of a movable braking element 12. Spring 14 is installed under a certain amount of compression and therefore tends to urge movable braking element 12 toward brake-released position; however, as will appear below, counteracting forces permit it to operate effectively only when the motor is itself operating.

On the opposite side of movable braking element 12 is an outwardly directed frusto-conical surface 17 which, not far from the periphery of shaft 4, gives way to a flat annular surface 18 of the plane of which extends normally to the axis of rotation of the shaft. Rigidly mounted on shaft 4 in a zone disposed outwardly of and spaced from the proximate portion of movable braking element 12 are multi-part retaining means including a cage or cage-like abutment 21 having a flat, radially extending outer end wall 22; see Figures 1, 2, and 3. Projecting inwardly from end wall 22 a short distance removed from the periphery of shaft 4 is the integrally formed cylindrical sleeve 23 best seen in Figures 4 and 5. Formed integrally with sleeve 23 are four radially extending portions 24. Each of the latter is provided, as shown in Figure 4, with a radially extending tapped opening 25 and a pair of outwardly directed vanes 26 which, when the motor is in operation, serve to force a current of air through the interior of the motor, roughly in a direction paralleling shaft 4.

End wall 22, inwardly projecting sleeve 23, radially extending portions 24 and the several pairs of vanes are preferably formed integrally, being interconnected as shown in Figure 5. Flanking certain of the radially extending portions 24 are pins 27 that are fixedly mounted in any convenient way in movable braking element 12. In the construction shown in the drawings, there are two pairs of pins 27, best seen in Figures 3 and 4. By means of pins 27, movable braking element 12 is caused to rotate with cage 21 at the same angular speed.

Within cage 21 is a generally cylindrical hollow 28 that is in communication with a cylindrical opening 29 in outer end wall 22 provided for the purpose of accommodating shaft 4.

On the inside face of outer end wall 22 is a flat surface 31 immediately surrounding opening 29 which, like surface 18 on movable braking element 12, extends transversely to the axis of rotation of shaft 4. Surrounding this flat surface is a frusto-conical surface 32 which is generally similar to but somewhat shorter than and slanted oppositely to frusto-conical surface 17 on movable braking element 12: see Figures 1 and 2. Located radially outward of frusto-conical surface 32 is a second flat surface 33 of generally annular shape which extends radially from the limits of frusto-conical surface 32 to the cylindrical surface defining the inside face of inwardly extending sleeve 23. Although not formed exactly like the opposing outwardly facing portions of movable braking element 12, the inside face of outer end wall 22 thus has portions which correspond to them in the sense that surfaces 31 and 18 are very similar and surfaces 32 and 17 are generally similar but oppositely slanted.

By means of the screws 34 (Figure 4), screw holes 34a (Figure 5), and registering screw holes 34b (Figure 6), wedge-mounting means 35 of the type shown in Figure 6 may be held rigidly in place in hollow 28 in cage 21. Wedge-mounting means 35 preferably take the form of a radially-slotted cylinder of such dimensions as to permit it to fit snugly in hollow 28. In the embodiment of the invention shown in the drawings, this cylinder is characterized by four rectangular slots 36 at angular intervals of 90° and, between them, by four arcuate surfaces 37. If desired, however, it could have two, three or five equally spaced slots with a corresponding number of arcuate surfaces separating them.

When located on shaft 4 in proper relation to cage 21, wedge-mounting means 35 will normally be in contact with the inside face of outer end wall 22, the end face of the cylinder being in engagement with flat surface 31 without appreciable clearance between them. However, the opposite end face of the cylinder, designated 39 in Figure 6, is spaced from flat surface 18 on movable braking element 12 by a clearance 38: see Figure 1. As movable braking element 12 moves out of the brake-set position of Figure 1 into the brake-released position of Figure 2, clearance 38 diminishes in size to become the lesser clearance 38a appearing in Figure 2. Wedge-mounting means 35 are, of course, duly provided with a suitable axial opening 40 (Figure 6) accommodating shaft 4 and are held rigidly in place on the shaft by means of set screws 41 (Figures 1, 2, and 4).

Loosely mounted in and guided as regards movement by the walls of slots 36 are the four speed-responsive wedges 42 appearing in cross section in Figure 4. A typical wedge is shown in perspective in Figure 7. Each of the four wedges has flat side surfaces 43, flat top and bottom surfaces 44, and flat end surfaces 45. Top and bottom surfaces 44 parallel each other, as do side surfaces 43 and end surfaces 45. In addition, each end of each of the wedges has an arcuate surface 46 located as shown in Figure 7. The curvature of arcuate surfaces 46 is such as to conform to the curvature of frusto-conical surfaces 17 and 32 on movable braking element 12 and cage 21, respectively. Wedges 42 take the form of rectangular parallelopipeds except where these arcuate surfaces impart to them their generally wedge-shaped appearance.

When the parts are in brake-set position, wedges 42 should be positioned near the bottom of slots 36 with arcuate surfaces 46 in engagement with frusto-conical surfaces 17 and 32, all as indicated generally in Figure 1. Slots 36 and wedges 42 should be in alignment with the tapped openings 25 in radially projecting portions 24, from which tapped openings smaller openings 47 extend radially as shown to and through inwardly projecting sleeve 23: see Figures 4 and 5. Coil springs 48 (Figures 1, 2 and 4) are located in and guided in their action by the walls of openings 47. The inner end of each of the four springs bears as shown against the top surface of one of the four wedges 42. Within the openings in coil springs 48, near their opposite ends, locating stems 49 project radially inward from adjusting plugs 50 each of which may be moved axially by means of a screw driver or similar tool. Coil springs 48 thus tend to urge wedges 42 toward the brake-set position shown in Figure 1.

Although physically smaller than spring 14, each of the four springs 48 individually is capable of overpowering it. For example, if a force of 2 pounds is exerted by the larger but more resilient spring 14, each of the four springs 48 may exert a force of 4 pounds in opposition to it. Thus wedges 42 are strongly biased toward positions at or near the bottoms of slots 36 and in turn strongly bias movable braking element 12 toward that position in which it is in braking engagement with stationary braking element 11. At this stage, which is one in which there is at most only a minor clearance 51 at the base of each of the four wedges but a major clearance 52 adjoining the top surface 44 of each of them, spring 14 is unable to move movable braking element 12 and wedges 42 out of their brake-set positions.

When, however, rotor 3 begins to turn shaft 4 in either angular direction in response to excitation of the motor, centrifugal forces commence operating on wedges 42. These forces, supplemented by the action of spring 14 on movable brake element 12, are more powerful than the forces exerted by coil springs 48 and therefore tend to move the wedges radially from the positions shown in Figure 1 into the positions shown in Figure 2. As the wedges move away from shaft 4, minor clearance 51 develops into the major clearance 51a; at the same time clearance 52 disappears entirely. At this point, the top surface 44 of each of the four wedges comes into contact with the cylindrical inner face of inwardly projecting sleeve 23 of cage 21, which operates after the fashion of an abutment to preclude further radial movement of the wedges.

It may be noted in passing that it is only in this brake-released position that wedges 42 are centered in relation to wedge-mounting means 35. In brake-set position, wedges 42 are offset therefrom in the direction of movable braking element 12 by an amount which is equal to the difference between clearance 38 (Figure 1) and clearance 38a (Figure 2). Thus as wedges 42 move away from shaft 4 under the combined influence of centrifugal forces and spring 14, the latter pushes them axially toward outer end wall 22. In the strictest sense, therefore, the wedges may be said to move diagonally out of the positions which they occupy in Figure 1 into those which they occupy in Figure 2.

Such movement is prompt, progressive and quiet, there being no chatter between stationary brake element 11 and movable braking element 12 and no appreciable hammer effect when wedges 42 abut against inward projecting sleeve 23.

When the supply of current to the motor is interrupted, deliberately or by accident, the reverse action takes place. As rotor 3 and shaft 4 slow down, wedges 42 tend to move back toward their original positions in slotted cylinder 35. As they do so, springs 48, being increasingly freed of the hampering effect of the centrifugal forces acting on wedges 42, come again into operation. Ultimately, as wedges 42 approach the bottoms of the respective slots 36, springs 48 overpower spring 14 and force movable braking element 12 into engagement with stationary brake element 11. When the motor comes to a rest, spring 14 is again wholly ineffective.

The braking action which occurs as just described is likewise prompt, progressive and quiet. There is no chattering as movable braking element 12 approaches stationary braking element 11 nor is there anywhere in the mechanism any hammer effect. The entire action is so rapid that by actuating a suitable switch, such as a foot switch, the operator can start and stop the motor in a matter of a very few seconds; as a matter of fact, he can stop the motor, start it and stop it a second time before the rotatable parts have had an opportunity to travel in an angular direction more than a few radians.

This feature presents important practical advantages from the standpoint, for example, of an operator using an engine lathe. When using an engine lathe, it is commonplace to slow down the rotation manually by pressing one hand on the chuck, adding the drag so introduced to the braking effect of the brake mechanism. However, this is at best a dangerous practice, for carelessness on the part of the operator may result in personal injury in the event that his thumb or fingers come into contact with a projecting portion of the chuck at a time when it is revolving too rapidly. According to the very rapid braking system provided by the present invention, it is never necessary for the operator to press his hand against the chuck; instead, without doing anything more than actuating a foot switch, he can stop the motor and re-start it, all within a matter of seconds.

It is apparent that numerous changes may be made in the invention as hereinabove described without departing from the inventive concept. For example, instead of wedges, it is presumably possible to use spring pressed balls making contact with oppositely directed faces on the movable braking element on one hand and the retaining means; i. e., the cage or cage-like abutment, on the other. It is obviously possible to form the brake symmetrically, utilizing a single stationary braking element and two movable braking elements, one on each side of the stationary braking element. Other similar changes will readily suggest themselves to those skilled in the art to which the invention appertains.

It is intended that the patent shall cover, by summarization in appended claims, all features of patentable novelty residing in the invention.

What is claimed is:

1. In a dynamo-electric machine, a housing; a rotatable shaft within the housing; a stationary braking element supported from the housing; a movable braking element in apposition to the stationary braking element; retaining means on the shaft; yieldable means within the retaining means for urging the movable braking element toward the stationary braking element, said yieldable means including a plurality of wedges that move away from the shaft in response to the action of centrifugal forces developed upon rotation of the shaft; and other yieldable means for urging the movable braking element away from the stationary braking element.

2. A dynamo-electric machine as in claim 1 in which the wedges rotate with the shaft.

3. A dynamo-electric machine as in claim 2 in which the wedges are mounted for radial movement in the retaining means.

4. A dynamo-electric machine as in claim 3 in which tapered surfaces on the wedges are opposed by complementary tapered surfaces on the movable brake element.

5. In a dynamo-electric machine, a housing; a rotatable shaft within the housing; a stationary braking element supported from the housing; a movable braking element in apposition to the stationary braking element; a cage adapted to rotate with the shaft; a plurality of radially movable wedges within the cage, said wedges exerting on the movable brake element a wedging action that diminishes as the wedges move radially away from the shaft in response to the action of centrifugal forces developed upon rotation of the shaft; spring means backing the wedges and reinforcing their action on the movable brake element; and other spring means opposing the action of the wedges on the movable brake element.

6. A dynamo-electric machine as in claim 5 in which the cage is rigidly attached to the shaft.

7. A dynamo-electric machine as in claim 6 in which the cage is adjustably positioned on the shaft.

8. A dynamo-electric machine as in claim 6 in which a cylinder slotted to accommodate the wedges is received within the cage.

9. In an electric motor, a motor housing; a stator within the motor housing; a rotor within the stator; a shaft within the rotor; a stationary braking element supported from the motor housing; a movable braking element within the motor housing in apposition to the stationary braking element; wedge-holding means on the shaft; a plurality of wedges supported by the wedge-holding means for movement away from the shaft in response to the action of centrifugal forces developed upon rotation of the shaft, said wedges narrowing toward the shaft and having surfaces engaging said movable braking element; and, encompassing said wedge-holding means, cage-like retaining means restraining the movement of the wedges, said retaining means, wedge-holding means and wedges being located within the motor housing.

10. An electric motor as in claim 9 in which biasing means acting on the wedges urge the wedges toward the shaft.

11. An electric motor as in claim 10 in which the biasing means take the form of coil springs.

12. In a dynamo-electric machine, a housing; a rotatable shaft within the housing; a stationary braking element supported from the housing; a movable braking element in apposition to the stationary braking element; retaining means on the shaft; a plurality of wedges within the retaining means, said wedges engaging but being movable in relation to the movable braking element in response to the action of centrifugal forces developed upon rotation of the shaft; spring means operating indirectly on the movable braking element through the intervention of the wedges; and spring means operating in opposition thereto directly on the movable braking element.

13. A dynamo-electric machine as in claim 12 in which the wedges tend to move the movable braking element toward the stationary braking element.

14. A dynamo-electric machine as in claim 13 in which the wedges taper inwardly toward the shaft.

15. In a dynamo-electric machine, a housing; a rotatable shaft within the housing; a stationary brake element supported from the housing; a movable brake element in juxtaposition to the stationary brake element; means for urging the movable brake element toward brake-set position including a plurality of retractible wedges each of which tapers inwardly toward the shaft, said wedges moving away from the shaft in response to the action of centrifugal forces developed upon rotation of the shaft; and resilient means for urging the movable brake element toward brake-released position.

16. A dynamo-electric machine as in claim 15 in which other resilient means act on the wedges.

17. A dynamo-electric machine as in claim 16 in which the resilient means acting on the wedges are more powerful than the resilient means for moving the movable braking element toward brake-released position.

18. In a dynamo-electric machine, a shell-like housing; a rotatable shaft within the housing; a stationary braking element supported from the housing, said stationary braking element having an annular braking surface; a movable braking element in apposition to the stationary braking element, said movable braking element having a cooperating annular braking surface; multi-part retaining means mounted on the shaft, said retaining means comprising a cage and a slotted cylinder within the cage; a plurality of wedges loosely mounted in the slotted cylinder for radial movement in response to the action of centrifugal forces developed upon rotation of the shaft, said wedges engaging and exerting a wedging action on the movable brake element; a plurality of coil springs acting on the wedges and reinforcing their action on the movable brake element; and, associated with the shaft, means opposing the action of the wedges on the movable brake element.

References Cited in the file of this patent
UNITED STATES PATENTS

| 345,670 | Campbell | July 20, 1886 |
| 1,994,588 | Nakashian | Mar. 19, 1935 |
| 2,432,591 | Schuckers | Dec. 16, 1947 |

FOREIGN PATENTS

| 885,413 | France | May 24, 1943 |